United States Patent [19]

Kumar et al.

[11] Patent Number: 5,057,987
[45] Date of Patent: Oct. 15, 1991

[54] FAULT DETECTION AND PROTECTION STRATEGY FOR A PAIR OF COMPLEMENTARY GTO THYRISTORS

[75] Inventors: Ajith K. Kumar; Thomas D. Stitt, both of Erie, Pa.

[73] Assignee: General Electric Company, Erie, Pa.

[21] Appl. No.: 618,783

[22] Filed: Nov. 27, 1990

[51] Int. Cl.$^5$ .......................................... H02H 7/122
[52] U.S. Cl. ...................................... 363/58; 363/96; 363/137; 361/79
[58] Field of Search ........................ 363/55, 56, 57, 58, 363/96, 136, 137, 138, 135; 361/79, 86, 87, 88, 93

[56] References Cited

U.S. PATENT DOCUMENTS

| | | | |
|---|---|---|---|
| 4,641,231 | 2/1987 | Walker et al. | 363/58 |
| 4,672,525 | 6/1987 | Horie et al. | 363/58 |
| 4,723,188 | 2/1988 | McMurray | 363/137 |

Primary Examiner—Peter S. Wong
Attorney, Agent, or Firm—R. Thomas Payne

[57] ABSTRACT

In an electric power converter comprising at least one pair of serially-connected, alternately conducting controllable electric valves spanning a pair of d-c conductors, the conducting state of each valve is detected by comparing the actual magnitude of valve current with a predetermined low threshold level and by comparing the difference between the juncture potential of the two valves and a reference potential of one of the d-c conductors with the potential diffence between both d-c conductors. If both comparisons indicate the valve is in a conducting state and if this state is indicted concurrently for both valves, logic means is operative to indicate that a "shoot through" fault has occurred. In this abnormal event, whatever turn on and turn off signals for the two valves were extant at the time such operation of the logic means commenced will be prevented from changing while both valves are conducting.

12 Claims, 6 Drawing Sheets

FAULT DETECTION AND PROTECTION STRATEGY FOR A PAIR OF COMPLEMENTARY GTO THYRISTORS

BACKGROUND OF THE INVENTION

This invention relates generally to electric power converters comprising two or more parallel pairs of series-connected, alternately conducting, high-speed, solid-state, unidirectional electric valves of the kind that can be switched between a non-conducting state (off) and a conducting state (on) in response to appropriate turn-on and turn-off signals being alternately applied to a control electrode of the valve, and it relates more particularly to means for detecting and responding to a malfunctioning valve that fails to remain off throughout the interval that the complementary valve of the same pair is properly conducting electric current.

Electric power converters are used for interconnecting an electric power source and electric load circuits in applications where the loads utilize electrical energy of different form, frequency, and/or magnitude than supplied by the source. In many practical applications, the converter is used to derive polyphase alternating voltage of variable amplitude and frequency from a source of unipolarity voltage of relatively constant magnitude. Such a converter is commonly known and hereinafter called an "inverter." A typical inverter has relatively positive and negative direct current (d-c) conductors connected to the voltage source, two or three output terminals connected to a single-phase or polyphase alternating current (a-c) load circuit, and means for connecting each output terminal to both of the d-c conductors. The latter means comprises multiple pairs of alternately conducting controllable electric valves, each pair being serially connected between the d-c conductors, and the node or juncture of each pair being coupled to the corresponding output terminal. Associated control means is operative periodically to apply alternative turn-on and turn-off signals to the control electrodes of the respective valves in each pair of valves so that the valves switch between on and off states in a manner that converts the unipolarity voltage across the d-c conductors into alternating voltage of unipolarity voltage across the d-c conductors into alternating voltage of desired fundamental amplitude and frequency at the output terminals of the inverter. The present invention is particularly useful in conjunction with an inverter that is part of the electrical propulsion system on board a traction vehicle, such as a rapid transit car, where the source of d-c power comprises a third rail to which the system is connected via a sliding current collector on the vehicle and the a-c load circuit is a three-phase induction motor (or more than one such motor) the rotor of which is drivingly connected by suitable gearing to an axle of the vehicle.

Controlled turn-on and turn-off devices, such as gate turnoff (GTO) thyristors and power transistors, are often used for the inverter valves. The presently preferred devices are GTO thyristors. Such a valve is a multilayer semiconductor designed to freely conduct "forward" anode current (i.e., current flowing into its anode and out of its cathode) when its control electrode (gate) is triggered by a suitable turn-on or firing signal. A GTO thyristor is distinguished from a conventional thyristor by its ability to interrupt or block forward anode current if a voltage of relatively negative polarity and appropriate magnitude and duration is applied across its gatecathode junction. Such voltage is negative in the sense that the electrical potential of the gate is negative with respect to the cathode. It causes current to flow in a reverse direction in the thyristor's gate. In other words, to turn off a GTO thyristor, current is drained from the gate. Hereinafter such current is referred to as either "negative gate current" or the "turn-off signal."

In normal operation, the anode current-blocking or turnoff process of a GTO thyristor can be initiated at any time without waiting for a natural or externally forced zero crossing of the anode current. The turnoff process requires a finite period of time. During this process the negative gate current rapidly rises to a high peak that depends on the magnitude of anode current to be interrupted and then subsides as the thyristor recovers its ability to withstand off-state anode voltage. Once a turnoff process is successfully completed, the resistance of the gate-cathode junction is very high and limits negative gate current to a trivial magnitude.

To protect the inverter valves, a reactor is connected in series with each valve to limit the rate of change of current with respect to time (di/dt) when turning on and a capacitive snubber is connected in parallel with each valve to limit the rate of change of voltage with respect to time when turning off. In normal inverter operation, the complementary valves of each pair are so controlled that they will conduct load current alternately. That is, either the valve whose anode is connected to the positive d-c conductor is turned on to conduct current in one direction from the source to the load, or the opposite valve, whose cathode is connected to the negative d-c conductor, is turned on to conduct current in the reverse direction from the load to the source. If both valves were conducting simultaneously, they would establish an undesirable short circuit between the two d-c conductors.

To avoid simultaneous conduction of complementary valves, it is common practice to delay the turn-on signal for each one of the valves until a preset certain period of time has elapsed following the application of a turn-off signal to the opposite valve. This delay period is somewhat longer than the maximum time required for the valve to complete its normal turn-off process after receiving a turn-off signal. For a more positive indication that the previously-conducting valve has in fact turned off, its gate voltage can be monitored and compared with a predetermined reference value in the manner disclosed and claimed in U.S. Pat. No. 4,641,231—Walker and Lezan granted on Feb. 3, 1987. Interlocking circuits inhibit the application of a turn-on signal to each valve unless the monitored voltage of the opposite valve is more negative than the aforesaid reference value.

The referenced patent of Walker and Lezan discloses another method wherein the voltage across the main electrodes of a valve and the direction of load current are used to determine when the valve has turned off. Once its anode-to-cathode voltage exceeds a predetermined positive threshold magnitude at the end of a load current conducting interval, the valve is known to be turned off.

The above-mentioned delay period and interlocking circuits are usually effective to prevent simultaneous conduction of complementary valves under normal conditions. However, an inadvertent malfunction or fault condition in one of the valves or in the associated control or power circuits can cause an undesirable "shoot through," i.e., the simultaneous conduction of both valves. In this abnormal event the simultaneously conducting valves provide a short circuit between the positive and negative d-c conductors of the inverter, and current will rise very rapidly to a dangerously high magnitude. Once a shoot through occurs, the sooner it is detected the better.

One of the known characteristics of a GTO thyristor is that the maximum current it can successfully turn off is relatively limited. Typically a power-rated GTO thyristor has a turn-off limit less than approximately 300% of the maximum steady state rms load current rating of the thyristor. A GTO thyristor is very likely to be destroyed if an attempt were made to switch it from turned-on to turned-off states while it is conducting anode current higher than this limit. However, so long as such turn-off is not attempted, a GTO thyristor can safely conduct current having a magnitude much higher than its turn-off limit for a short length of time. In other words, a GTO thyristor is capable of conducting an occasional surge of current having a peak magnitude significantly greater than the maximum magnitude of current it can interrupt.

It is a known practice to provide overcurrent protective means for applying a turn-off signal to the gate of a turned-on GTO thyristor in response to anode current increasing above a pre-set magnitude that is higher than normal but lower than the thyristor's turn-off limit. If the rate of current increase is not too fast or the maximum current magnitude is not higher than the turn-off limit, the thyristor will have enough time, after an overcurrent condition is detected, to successfully complete its turn-off process before current can attain the turn-off limit. This would usually be true if the abnormal current rise were due to a fault in the electric load circuit, in which case the inductances in the load and interconnecting cables would tend to limit the rate of rise. However, it would probably not be true if the abnormally high current were the result of a shoot through. In the latter case, there is a steeply rising surge of current (e.g., 200 amps per microsecond) discharging the voltage-smoothing capacitor that is conventionally connected across the output of the power source to which the d-c conductors of the inverter are directly connected, and this current can rise above the turn-off limit of each GTO thyristor in a shorter time than required to complete the turn-off process after the abnormally high current is detected.

SUMMARY OF THE INVENTION

A general objective of the present invention is to provide improved means for detecting the conducting state of a controllable electric valve that is half of a pair of alternately conducting valves connected in series with one another between the d-c input conductors of an electric power inverter.

Another objective is to provide, in an electric power inverter comprising multiple pairs of serially-connected, alternately conducting controllable electric valves spanning the d-c conductors of the inverter, improved means for protecting the valves in the abnormal event of a temporary shoot through of the complementary valves in any one of such pairs.

In carrying out the invention in one form, two alternately conducting GTO thyristors are connected in series with one another between relatively positive and negative d-c conductors that are adapted to be connected to a source of electric power. The juncture of these thyristors forms an a-c terminal that is adapted to be connected to an alternating current load circuit. Each thyristor has a control electrode to which alternative turn-on and turn-off signals are periodically applied. Such signals are applied at times determined by associated gating means, the operation of which is normally controlled by a train of discrete command signals.

First and second means are provided for detecting the conducting states of the respective thyristors. The first detecting means provides a first output signal if a first one of the thyristors is conducting load current from the positive d-c conductor to the a-c terminal, and the second detecting means provides a second output signal if the other thyristor is conducting load current from the a-c terminal to the negative d-c conductor. Logic means coupled to both detecting means is operative to indicate that the two thyristors are conducting simultaneously only when the first and second output signals are being provided concurrently. In this event, normal operation of the gating means is suspended, thereby temporarily overriding the command signals and preventing any further changes of the turn on and turn off signals applied to the control electrodes of the respective thyristors. As a result, both GTO thyristors are allowed to continue conducting simultaneously once this abnormal condition is indicated by the logic means. This will save the thyristors from being destroyed by attempting to interrupt a surge of shoot-through current having a magnitude higher than their turn-off limit.

In one aspect of the invention, the first detecting means is arranged to provide the first output signal if the magnitude of current conducted by the first thyristor exceeds a predetermined low level and the potential of the a-c terminal referenced to the potential of the negative d-c conductor exceeds a predetermined first fraction of the potential difference between the two d-c conductors, said first fraction being greater than approximately $\frac{1}{4}$ but less than $\frac{1}{2}$. The second detecting means is arranged to provide the second output signal if the magnitude of current conducted by the other thyristor exceeds the aforesaid low level and the potential of the a-c terminal does not exceed a predetermined second fraction of the potential difference between the d-c conductors, said second fraction being less than approximately $\frac{3}{4}$ but greater than $\frac{1}{2}$.

The invention will be better understood and its various objective and advantages will be more fully appreciated from the following description taken in conjunction with the accompanying drawings.

DETAILED DESCRIPTION OF THE INVENTION

Figure 1:
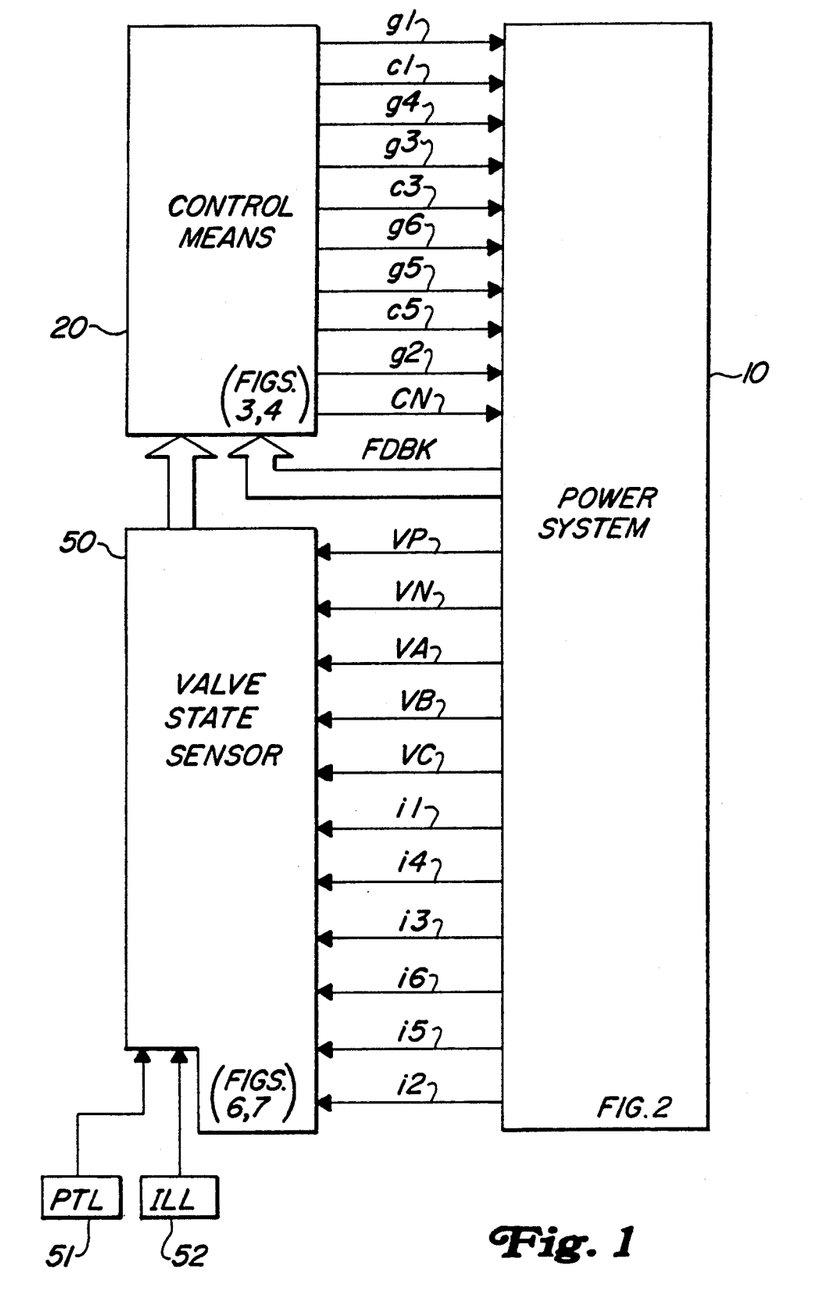
FIG. 1 is a block diagram of electric power apparatus embodying the present invention, which apparatus comprises a power system including a plurality of controllable electric valves, means for controlling the conducting states of such valves, and a valve state sensor.

FIG. 1 is intended to show electrical apparatus that may be used, for example, as the electric propulsion system on a self-propelled traction vehicle. It has three main components: a power system 10; control means 20 coupled to the power system so as to receive certain feedback signals therefrom and to supply periodic gate drive signals that turn on and off six electric power switching valves in the power system 10; and a valve state sensor 50 coupled to both the power system 10 and the control means 20. The valve state sensor 50 receives various voltage and current feedback signals from the power system 10, and it also receives separate current reference signals PTL (Protective Turn-off Level) and ILL (Current Low Level). The latter signals are respectively provided by suitable sources 51 and 52 coupled to the sensor 50, such sources being preset so that the signal PTL has a desired high constant value and the signal ILL has a desired constant value much lower than PTL. As will soon be more fully explained, the valve state sensor 50 supplies certain state indicating signals to the control means 20.

Figure 2:
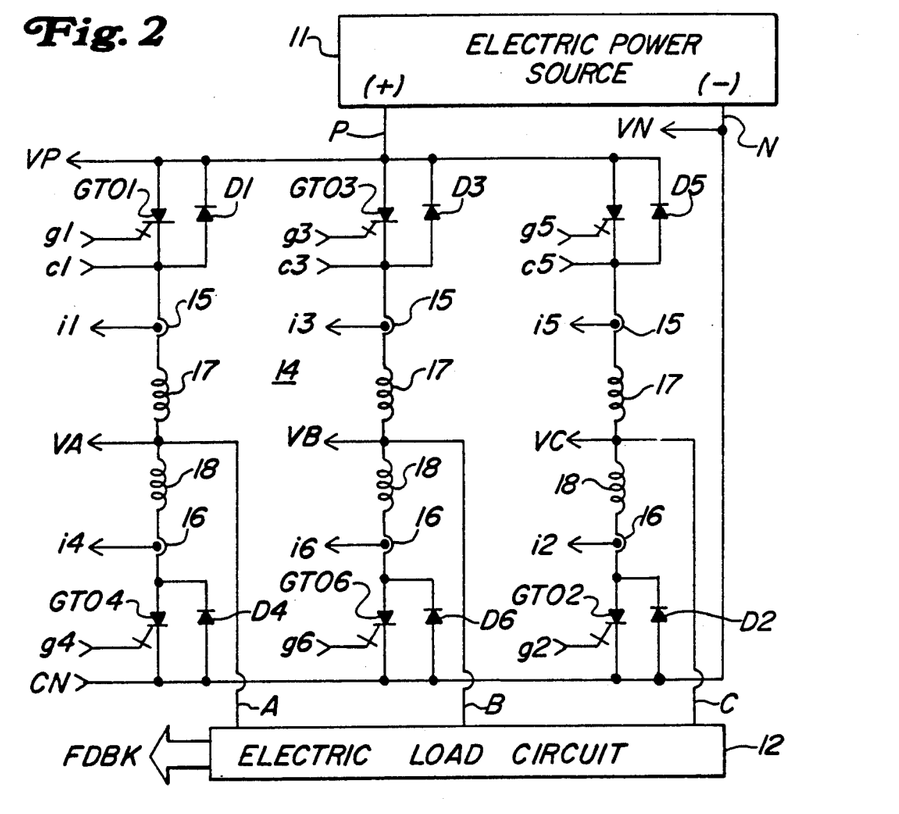
FIG. 2 is a schematic diagram of an electric power source, a three-phase inverter, and an electric load circuit comprising the power system shown as a single block in FIG. 1.

The power system 10 will now be described with reference to FIG. 2. It includes a source 11 of electric power, an electric load circuit 12, and means for interconnecting the source 11 and load 12. The latter means comprises an electric power converter 14 having relatively positive and negative d-c conductors P and N connected respectively to the positive (+) and negative (−) output terminals of the source 11. In the illustrated application of the invention, the load circuit 12 is an adjustable speed three-phase induction type a-c traction motor, the converter 14 is a three-phase voltage source inverter, and the power source 11 includes a wayside d-c substation that energizes a section of third rail with which a current collecting shoe on the vehicle is in sliding contact. The shoe is connected to the positive output terminal of the source 11 via a conventional line breaker (not shown). So long as the third rail section is energized and the line breaker is closed, the source 11 will apply a unipolarity voltage of relatively constant average magnitude to the d-c conductors P and N of the inverter 14. A conventional filter capacitor (not shown) is connected between the positive and negative output terminals of the source 11 for the purpose of smoothing this voltage, i.e., reducing its a-c ripple amplitude.

The inverter 14 comprises three similar pairs of high-speed, solid-state controllable electric valves connected in series with one another between conductors P and N. Preferably these valves are unidirectional gate turnoff thyristors or GTO devices. In FIG. 2 the valves comprising the first pair are designated GTO1 and GTO4, respectively, and their juncture forms an a-c terminal connected via a line A to a first phase of the load 12. The valves comprising the second pair are designated GTO3 and GTO6, respectively, and their juncture forms another a-c terminal connected via a line B to a second phase of the load 12. The third pair of valves are designated GTO5 and GTO2, respectively, and their juncture forms a separate a-c terminal connected via a line C to the third phase of the load. Each of the odd numbered valves has its anode connected directly to the positive conductor P and its cathode connected through current sensing means 15 and a di/dt limiting reactor 17 to the associated a-c terminal. Each of the even numbered valves has its cathode connected directly to the negative conductor N and its anode connected through separate current-sensing means 16 and another reactor 18 to the associated a-c terminal. Because the contemplated load (e.g., an a-c motor) has appreciable inductance, conventional freewheeling current conducting paths comprising inversely-poled solid-state diodes D1 through D6 are respectively connected in parallel circuit relationship with the six valves GTO1 through GTO6. Although not shown in FIG. 2, in practice a suitable capacitive snubber circuit is conventionally connected across each valve.

The current sensing means 15 and 16 are of conventional design, such as Hall devices. As is indicated in FIG. 2, the first current sensing means 15 in section A of the inverter 14 derives a first current feedback signal i1 having a value representative of the magnitude of anode current conducted by the first valve GTO1 in this section, whereas the second current sensing means 16 derives a second current feedback signal i4 having a value representative of the magnitude of anode current conducted by the opposite valve GTO4 in the same section. Similarly, current sensing means 15 and 16 in section B derive feedback signals i3 and i6 having values representative of the magnitudes of anode current in the valves GTO3 and GTO6, and current sensing means 15 and 16 in section C derive feedback signals i5 and i2 having values representative of the magnitudes of anode current in the valves GTO5 and GTO2. Suitable voltage dividers (not shown) are used to obtain voltage signals VP and VN proportional to the potential of the d-c conductor P and the potential of the d-c conductor N, respectively, and also to obtain a set of three voltage signals VA, VB and VC respectively proportional to the voltage magnitudes on the a-c lines A, B and C.

The six valves GTO1 through GTO6 in the inverter 14 have control electrodes (gates) g1 through g6, respectively. Each valve will freely conduct anode current (i.e., current flowing into its anode and out of its cathode) when its gate is triggered by a suitable turn-on or firing signal and will effectively block such current after a turn-off signal is alternatively applied to the same gate. In one application of the invention, the inverter is designed for a duty cycle wherein the valves conduct approximately 500 amperes rms full-load current when turned on, withstand a forward voltage of approximately 1,200 volts when turned off, and switch from on to off states while load current approaches a peak magnitude of approximately 1,150 amperes, such valves being capable of successfully turning off current as high as 2,000 amperes in response to a turn-off signal of suitable magnitude. Whenever one of the odd-numbered valves is in its turned-on state, it present negligible resistance to forward load current, and such current can freely flow from d-c conductor P to the corresponding a-c line A, B or C. Similarly, whenever one of the even-numbered valves is in its turned-on state, it presents negligible resistance to reverse load current, and such current can freely flow to d-c conductor N from the corresponding a-c line A, B or C. But in its turned-off state the valve resistance has such a high ohmic value as to block or interrupt any load current. Each GTO valve is switched between these two states by alternative turn-on and turn-off signals that are periodically applied to its gate-cathode junction. Such signals are supplied by the associated control means 20. As will next be described with reference to FIG. 3, in normal operation the turn-on and turn-off signals that the control means applies to the two values in each of the three sections or phases A, B and C of the inverter 14 are so coordinated that the conducting states of these values underlap each other. In other words, the values of each pair will conduct load current alternately: the odd numbered valve being turned on after the opposite or even numbered valve has been turned off, and the latter valve being turned on after the odd-numbered valve has been turned off. Thus the two valves of each pair are sometimes herein referred to as complementary valves.

Figure 3:
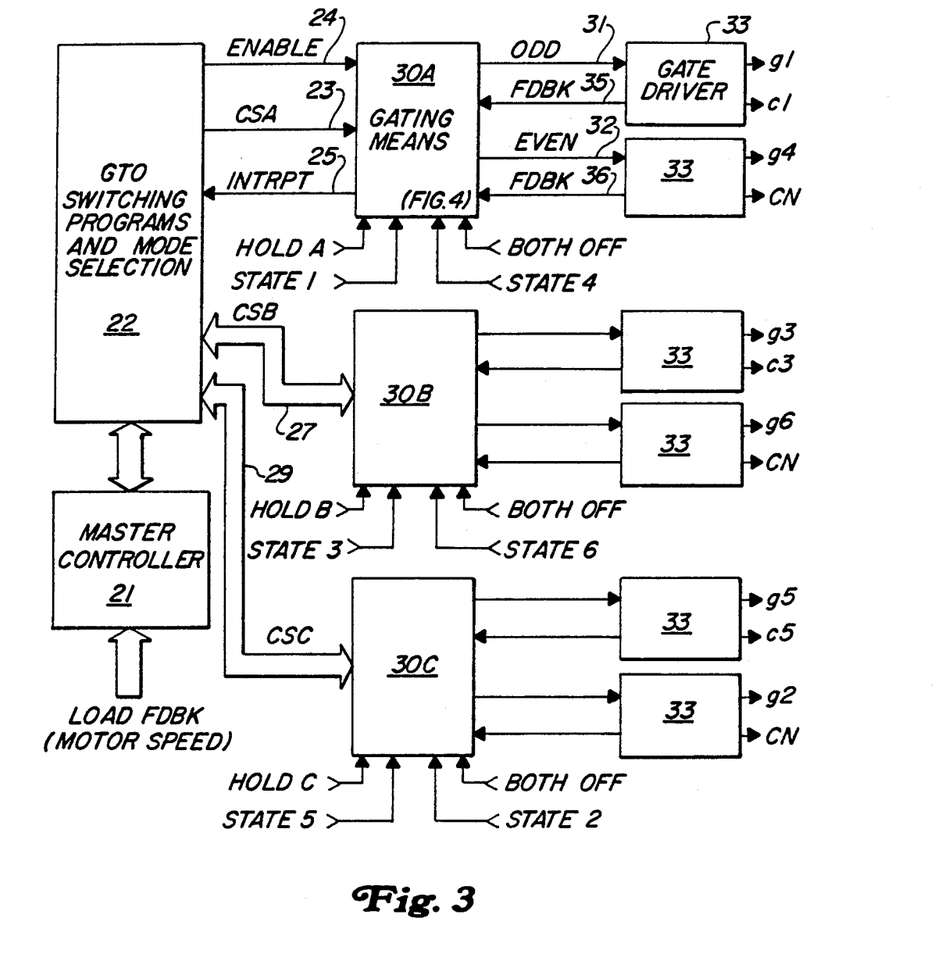
FIG. 3 is an expanded block diagram of the control means shown as a single block in FIG. 1.

As is shown in FIG. 3, the control means 20 comprises a master controller 21 that is interconnected with a block 22 representing suitable means for programming the state switching of the inverter valves GTO1 through GTO6 and for selecting the mode in which such switching is carried out. Persons skilled in the art will understand that a "square wave" mode of operation will enable maximum output voltage to be obtained at the a-c terminals of the respective inverter phases A, B and C, whereas the well-known "pulse width modulation (PWM)" mode will be effective when relatively low output voltage is desired. If the desired voltage magnitude is in between the magnitudes obtained with square wave and PWM modes, an appropriate third or transitional mode of operation is utilized. Whatever mode is selected, the programming and mode selecting means 22 receives from the master controller 21 a family of variable input signals that are replicas of the desired fundamental waveforms of the three-phase inverter output voltages and currents, and it is suitably arranged to produce three different command signals CSA, CSB and CSC that control the switching between conducting and non-conducting states of the respective pairs of complementary valves forming the three phases of the inverter 14, such switching being appropriate to achieve correspondence between the actual and desired inverter output. In modern practice, the programming and mode selecting means 22 comprises a microcomputer suitably programmed to perform the desired functions.

Figure 4:
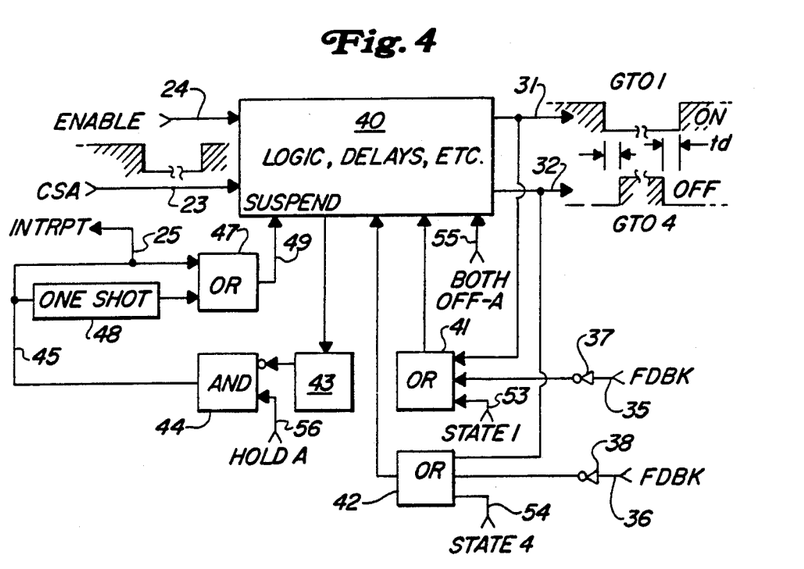
FIG. 4 is a schematic diagram of the preferred embodiment of the gate interlock logic and delay means shown as a single block in FIG. 3.

Each of the three switching command signals CSA, CSB, and CSC produced by the means 22 is actually a train of periodic, discrete signals that alternate between a digital "1" or high state and a digital "0" or low state, each 0-to-1 transition marking the end of a load current conducting interval of the even-numbered valve of the associated valve pair and the start of a conducting interval of the opposite valve of the same pair, and each 1-to-0 transition marking the end of a load current conducting interval of the odd-numbered valve and the start of a conducting interval of the other valve. The first command signal CSA is supplied via a line 23 to first gating means 30A that introduces gate interlock logic and delays. The logic and delay functions will be explained later when FIG. 4 is described. An enable signal is also supplied, via a line 24, to the gating means 30A which selectively returns an interrupt signal to the programming and mode selecting means 22. The latter means is similarly interconnected with second gating means 30B via a data link 27 and with third gating means 30C via another data link 29. The gating means 30B and 30C are duplicates of the first gating means 30A.

Each of the gating means 30A, 30B and 30C has first and second output lines 31 and 32 that are respectively coupled to a pair of duplicate gate drivers 33. Each of the gate drivers in turn is connected to both the gate and the cathode of a separate inverter valve. The first gate driver 33 is suitably constructed and arranged to apply a turn-on signal to the gate g1 of the odd-numbered valve GTO1 of the associated valve pair in response to a "1" or high signal being provided on the first output line 31 of the gating means 30A and to apply a turn-off signal to the same gate in response to the absence of a high signal (i.e., in response to a "0" or low signal) on the first line 31. Similarly, the second gate driver 33 applies a turn-on signal to the gate g4 of the opposite, even-numbered valve GTO4 of the same pair in response to a high signal being provided on the second output line 32 of the gating means and to apply a turn-off signal to the gate g4 in response to the absence of a high signal on the second line 32. Thus the actual timing of the alternative turn-on and turn-off signals that are periodically applied to the respective gates g1 and g4 is determined by the 0-to-1 and 1-to-0 transitions of the signals on the two output lines of the gating means 30A. For a purpose that will soon be explained, each gate driver includes means for selectively developing a gate voltage signal that is supplied to the gating means 30A via a feedback line (line 35 for the gate of the odd-numbered valve and line 36 for the gate of the opposite valve). FIG. 3 shows that the two output lines of the second gating means 30B are respectively coupled to another pair of gate drivers 33, and the two output lines of the third gating means 30C are respectively coupled to a third pair of duplicate gate drivers.

Figure 7:
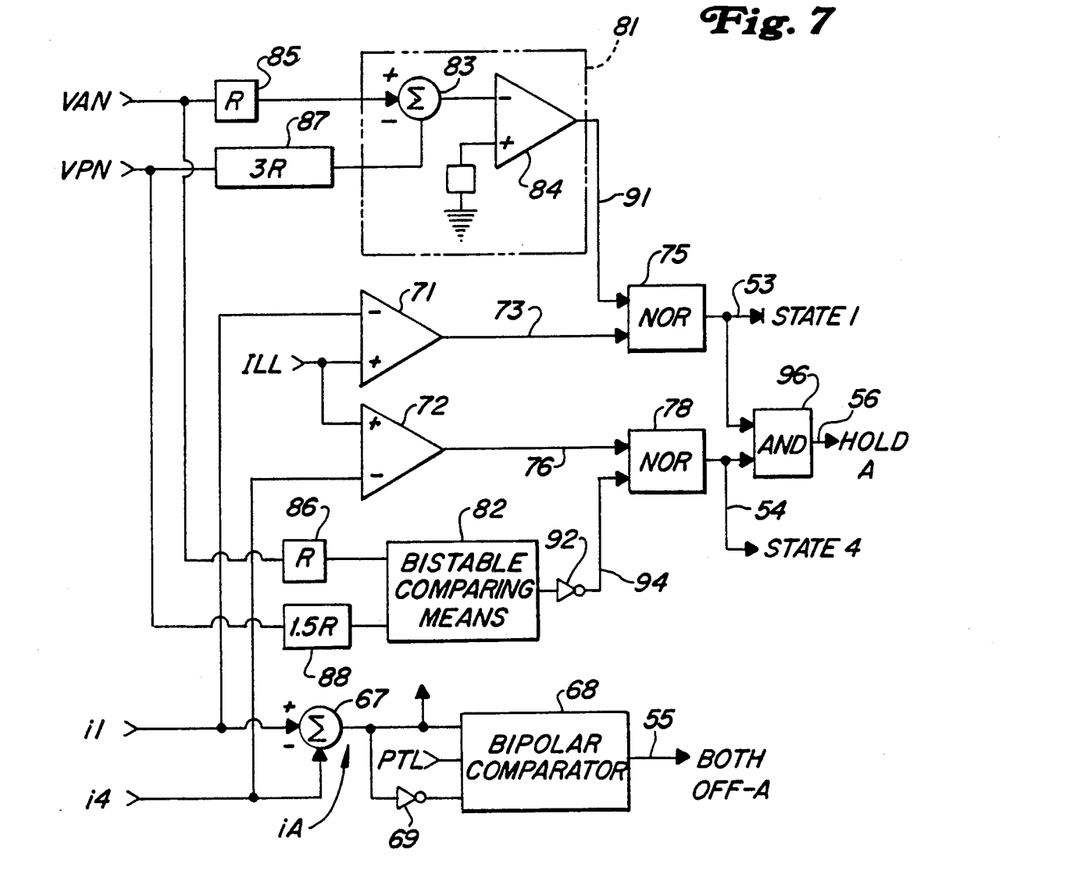
FIG. 7 is a functional block diagram of a presently preferred embodiment of one of the three duplicate comparing and logic circuits shown in block form in FIG. 6.

The gating means 30A will now be described with reference to FIG. 4. It comprises a block 40, labeled "Logic, Delays, etc.," to which the aforesaid command and enable signals are supplied over lines 23 and 24, respectively, and from which the aforesaid first and second output lines 31 and 32 emanate. It is also supplied with first and second inhibit signals provided by a pair of duplicate logic circuits 41 and 42, respectively. The logic circuit 41 has three inputs: one is connected directly to the first output line 31; another is connected via a polarity inverter 37 to the gate driver feedback line 35; and the third is connected via a line 53 to the valve state sensor 50. The signal on line 31 will be "0" throughout the desired turn-off intervals of the valve GTO1 in the inverter 14. In a manner that is explained in the previously referenced patent of Walker and Lezan, the signal on line 35 is high only if the gate-to-cathode voltage of the valve GTO1 is more negative than a predetermined reference value, as will be true when this valve is in its non-conducting state. Therefore the output of the polarity inverter 37 is "0" whenever the valve GTO1 is actually turned off. In a manner that will be explained when FIG. 7 is described, a "State 1" signal is provided on the line 53 and this signal is "0" if no current is sensed by the current sensor 15 associated with the valve GTO1. The logic circuit 41 is so constructed and arranged that the signal at its output is high or "1" (herein called the first inhibit signal) as long as at least one of the signals supplied to its three inputs is 1, and the output signal is low only when all three inputs are 0 concurrently. The latter condition is true when GTO1 is actually turned off.

As is shown in FIG. 4, the three inputs of the other logic circuit 42 are respectively connected to the second output line 32, via a polarity inverter 38 to the feedback line 36, and via a line 54 to the valve state sensor 50. The signal on line 36 is high only if the gate-to-cathode voltage of the valve GTO4 is more negative than the aforesaid reference value, as will be true when this valve is in its non-conducting state. A "State 4" signal is provided on the line 54, and this signal is "0" if no current is sensed by the current sensor 16 associated with the valve GTO4. The output signal of the logic circuit 42 is 1 (herein called the second inhibit signal) as long as at least one of the signals supplied to its three inputs is 1, and the output signal is 0 only when all three inputs are 0 concurrently, as is true when GTO4 is actually turned off.

The block 40 in the gating means 30A represents suitable means for performing several interrelated functions. In normal operation, the enable signal on line 24 is high or "1." This permits the logic means in the block 40 to respond to a 0-to-1 transition of the command signal CSA on line 23 by changing the signal on the second output line 32 from 1 to 0 and subsequently changing the signal on the first output line 31 from 0 to 1, and to respond to a 1 to 0 transition of the same command signal by changing the signal on the first output line 32 from 1 to 0 and subsequently changing the signal on the second output line 32 from 0 to 1. If the enable signal were removed (i.e., if the signal on line 24 were changed from 1 to 0), the logic means would then cause the signals on both output lines 31 and 32 of the gating means 30A to have low or "0" states. This result would also be obtained if a "both off-A" signal received via a line 55 from the valve state sensor 50 were high or "1." Another function performed by the block 40 is to ensure that each time the gating means provides a 1 signal on either one of the output lines 31 and 32, this signal will exist for at least a desired min-on period regardless of whether the command signal CSA is 1 or 0, and to ensure that once either output signal changes from 1 to 0, it will remain 0 for at least a desired minimum interval.

Yet another function of the block 40 is to prevent any 0-to-1 change of either one of the two output signals of the gating means before there is assurance that the valve controlled by the other output signal is actually turned off. If desired, this "underlap" function may be carried out in the manner disclosed in the patent of Walker and Lezan, in which case the signal on the second output line 32 would not be permitted to change from 0 to 1 if the first inhibit signal were being provided by the logic circuit 41, and the signal on the first output line 31 would not be permitted to change from 1 to 0 if the second inhibit signal were being provided by the companion logic circuit 42. Alternatively and preferably, the underlap function is carried out by using timing means for delaying each 0-to-1 change of the signal on the first output line 31 until a predetermined period of time (td) has elapsed after each 0-to-1 transition of the command signal CSA and for similarly delaying each 0-to-1 change of the signal on the second output line 32 until the same period has elapsed after each 1-to-0 transition of CSA. The time delay period td is selected to be longer than the maximum time required under all normal conditions for the turn-off process of a conducting valve to be successfully completed once a turn-off signal is applied to the valve's gate. In one practical application, td is approximately 100 microseconds. Where such timing means is used to achieve the desired underlap function, the block 40 can advantageously be arranged to send back to the programming and mode selecting means 22 a fault signal if the first inhibit signal is still present when the delay period for the second output signal expires or if the second inhibit signal is still present when the delay period for the first output signal expires.

Each time either one of the valves GTO1 and GTO4 is switched between turned-on and turned-off states, electrical transients will be caused by current changes in the associated di/dt limiting reactors 17 and 18 and voltage changes of the associated snubber capacitors connected across the respective valves. Such transients are relatively short lived. To allow time for transients to subside before the next valve switching action occurs, it is conventional practice to design the gating means so that neither one of the signals on its two output lines 31 and 32 can change states throughout each of the aforesaid delay periods td and throughout the aforesaid min-on period following each 0-to-1 transition of the signal on either output line. The block 40 is suitably arranged to perform this conventional function. The min-on period can be either the same length as or a different length than the delay period td. FIG. 4 and ancillary block 43 is intended to represent bistable means having a low or "0" output state normally, and a high or "1" output state during each of the td and min-off periods.

Figure 5:
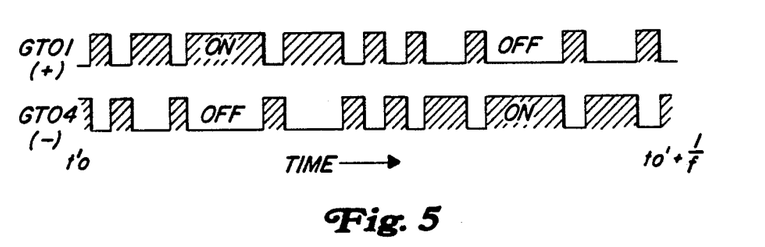
FIG. 5 is a time chart of the periodic on and off states of each of the complementary controllable electric valves forming one of the three pairs of alternately conducting valves of the FIG. 2 inverter during a typical full cycle of fundamental frequency while a pulse width modulation (PWM) mode of inverter operation is selected.

In normal operation the above-described gating means 30A periodically changes the states of the signals on its output lines 31 and 32 so that the associated gate drivers apply turn-on and turn-off signals to the gates of the complementary valves GTO1 and GTO4 in a sequence that causes these two valves to conduct load current alternately. FIG. 5 shows a typical pattern of the on and off states of the phase A pair of valves GTO1 and GTO4 over a full cycle of fundamental frequency f in the PWM mode. The on and off states of each of the other two pairs of complementary valves will have the same pattern as illustrated in FIG. 5 except that the pattern of the phase B pair GTO3 and GTO6 is staggered by one-third of the period of the illustrated pattern and the pattern of the phase C pair GTO5 and GTO2 is staggered by two-thirds of the period of the illustrated pattern.

Certain malfunctions or faults can cause a shoot through in the inverter 14, i.e., simultaneous conduction of both of the complementary valves comprising a valve pair. This abnormal condition results in an undesired short circuit between the two d-c conductors P and N, and anode current in each of the simultaneously conducting valves will rise very rapidly to a dangerously high magnitude. As will soon be described with reference to FIGS. 6 and 7, the valve state sensor 50 includes improved means for detecting such a shoot through and for supplying to the gating means 30A, via a line 56, a "hold A" signal that is high or "1" only if both valves GTO1 and GTO4 are in their turned-on states simultaneously. The gating means is so designed that its normal operation is suspended and the signals on its two output lines 31 and 32 will remain unchanged while the hold A signal is high. Consequently, so long as the complementary valves GTO1 and GTO4 continue conducting simultaneously, no attempt will be made to apply a turn-off signal to whichever one of them was properly conducting at the time the shoot through condition was first detected. This strategy protects the properly conducting valve from being destroyed. As explained earlier, a GTO thyristor has a relatively limited turn-off rating (e.g., 2,000 amperes maximum), whereas shoot through current increases very rapidly and is likely to attain a magnitude higher than this limit during the finite time that such a valve requires to complete its turn-off process after a turn-off signal is applied.

The gating means 30A will generate an interrupt signal on the line 25 in response to the detection of a shoot through condition. If the shoot through is initially detected either during a delay period td following a 1-to-0 state change of the signal on either one of the output lines 31 and 32, or during a min-on period following a 0-to-1 state change of either output signal, it is desirable to delay the interrupt signal generating action until the end of such period. This delay function will avoid a spurious interrupt signal in the event the hold A signal is momentarily high during such td or min-on period. As mentioned above, electrical transients will occur in the power circuit immediately following each state change of either output signal. There is a possibility that such a transient will cause the valve state sensor 50 to produce a high hold A signal on the line 56. However, in this event the resulting high hold A signal would subside very quickly and return to its normal low state before the end of the td or min-off period, and no interrupt signal would be generated. On the other hand, if the high hold A signal were caused by a true shoot through, it would not subside that quickly and would still be high when the td or min-on period expires, at which time the delayed interrupt signal would be generated. Preferably the gating means 30A also includes means for ensuring that once a true shoot through is detected normal operation of the gating means will remain suspended for a certain period of time.

To implement the two functions described in the preceding paragraph, either software, firmware, or hardware may be used. As it is illustrated in FIG. 4, the interrupt delay is implemented by an AND logic function 44 having a first regular input and a second "not" input. The first input is coupled to the line 56 and is high whenever a high hold A signal is being supplied by the valve state sensor. The not input is coupled to the bistable means 43 which has a normally low output. A line 45 interconnects the output of the AND logic 44 and the interrupt line 25. An interrupt signal is generated on the line 25 whenever there is a 0-to-1 transition of the signal on the line 45. The signal on the line 45 will track the hold A signal on line 56 so long as the output of the bistable means 43 is low. But whenever the latter output is high, as is true only during the aforesaid td and min-on periods, the signal on line 45 must be low and any high hold A signal on the line 56 will be effectively suppressed by the AND logic function 44. Consequently, if a high hold A signal commences while the output of the bistable means 43 is high, no interrupt signal is generated on the line 25 until the concurrence of two conditions: the output of the bistable means 43 returns to its normally low state, and the hold A signal remains high.

The output line 45 of the AND logic function 44 is also connected directly to one input of an OR logic circuit 47 and through a "one shot" timer 45 to the other input of the same circuit. The output of the timer 45 is normally low but will change to a temporary high or "1" state as soon as the signal supplied to its input changes from 0 to 1, will then remain high for a predetermined fixed internal of time even if the input signal changes sooner from 1 to 0, and will automatically return to its normal "0" state at the end of such interval, even if its input remains high. The fixed interval is equal to the desired period during which the gating means 30A is to remain in its suspended state after a shoot through is detected. So long as either the output of the AND logic function 44 or the output of the timer 48 is high, the output of the OR logic circuit 47 is high. The latter output is connected via a line 49 to a "suspend" input of the block 40. The block 40 includes annuling means responsive to a high signal on the line 49 for suspending the normal operation of the gating means 30A and thereby preventing any further changes of the signals that this gating means provides on its two output lines 31 and 32 regardless of command signal changes on the line 23 and regardless of whether or not there is an enable signal on the line 24. As a result, the gate drivers 33 to which the output lines 31 and 32 are coupled temporarily hold whatever turn-on and turn-off signals are extant at the time the high hold A signal on the line 56 commences. Once the annuling means is activated, the timer 48 ensures that it will be effective to suspend normal operation of the gating means 30A for the aforesaid desired period of time (e.g., approximately one second).

The operation of the control means when a shoot through is detected will be summarized next. As soon as the valve state sensor 50 produces a high hold A signal on the line 56 and the output of the bistable means 43 is in its normally low state, there is a 0-to-1 transition of the signal on the output line 45 of the AND logic function 44. This causes an interrupt signal to be sent back over line 25 to the programming and mode selecting means 22 which responds thereto by removing the enable signals from all three of the gating means 30A, 30B and 30C. As a result, the gating means 30B and 30C are immediately disabled, and turn-off signals are concurrently applied to the gates of both complementary valves of both of the inverter phase B and phase C valve pairs. Simultaneously with the generation of the interrupt signal, the signal on the output line 49 of the OR logic circuit 47 goes high to activate the annuling means in the block 40. Later, as soon as the high output interval of the one shot timer 48 expires, the logic means in the block 40 will cause the signals on both output lines 31 and 32 to be 0 concurrently, whereupon turn-off signals will be applied to the gates of both valves GTO1 and GTO4.

During the interval when the annuling means is activated and therefore normal operation of the gating means 30A is suspended, the shoot through current being conducted by the complementary valves GTO1 and GTO4 will subside from its peak magnitude to zero due to external causes such as a natural "ringing" phenomenon in the associated power circuit, or the opening of the line breaker in the power source 11. Once the valves stop conducting, the hold A signal on line 56 terminates (i.e., returns to "0"). So long as the peak magnitude of shoot through current does not exceed the one-cycle surge current rating of the valves (e.g., approximately 15,000 amperes), both valves will safety survive a temporary shoot through condition (unless such condition was precipitated by the failure of one of the valves). The current surge will significantly raise the temperature of the conducting junctions in the valves. In order to allow extra time for the valves to cool before a normal switching operation can resume, the interval of the suspended state of operation is selected to be much longer than the duration of a typical surge of shoot through current.

The preferred embodiment of the valve state sensor 50 will now be described with reference to FIGS. 6 and 7. In the manner shown in FIG. 6, the individual voltage signals VP, VN, VA, VB, and VC are supplied to four separate summing means 60, 61, 62, and 63 from which the following voltage feedback values are preferably derived: a value VPN representative of the potential difference between the two d-c conductors P and N; a value VAN representative of the potential difference between the inverter a-c terminal connected to phase A of the load circuit and the negative d-c conductor N; a value VBN representative of the potential difference between the inverter a-c terminal connected to phase B of the load circuit and conductor N; and a value VCN representative of the potential difference between the a-c terminal connected to phase C of the load and conductor N. The voltage feedback value VPN is in turn supplied to inputs of three duplicate comparing and logic circuits 65A, 65B, and 65C. The voltage feedback value VAN is supplied to another input of the first circuit 65A, the voltage feedback value VBN is supplied to another input of the second circuit 65B, and the voltage feedback value VCN is supplied to another input of the third circuit 65C. As is indicated by vertical arrows in FIG. 6, all four of these voltage feedback values are also supplied to the control means 20 where they are used for various conventional control and protective purposes.

Figure 6:
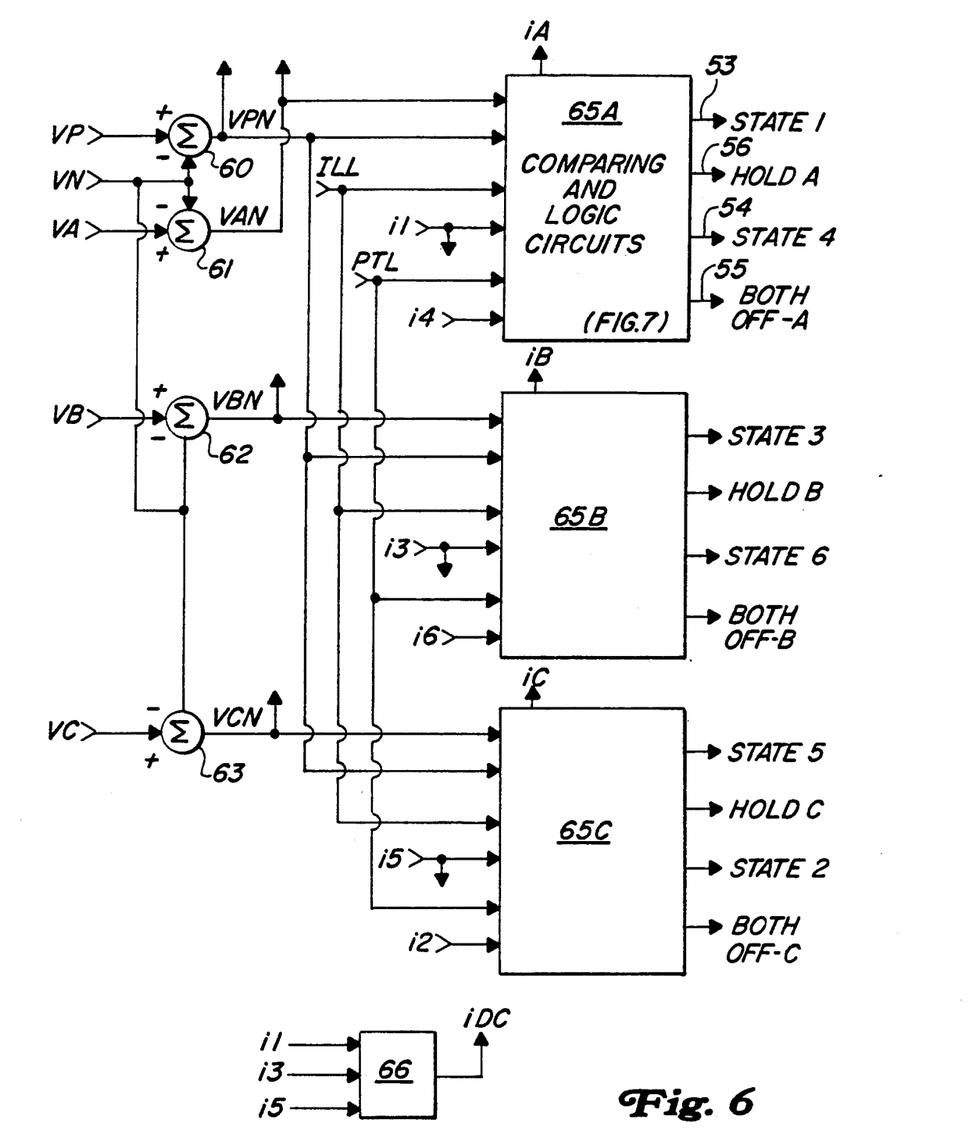
FIG. 6 is a schematic diagram of the improved valve state sensor shown as a single block in FIG. 1.

FIG. 6 shows that the current reference signals PTL and ILL are supplied to separate inputs of each of the comparing and logic circuits 65A, 65B and 65C. The first circuit 65A is also supplied with the current feedback values i1 and i4 derived by the current sensors associated with the phase A pair of complementary valves. Similarly, the second circuit 65B is supplied with the current feedback values i3 and i6 derived by the current sensors associated with the phase B pair of complementary valves, and the third circuit 65C is supplied with the current feedback values i5 and i2 derived by the current sensors associated with the phase C pair of valves. The three odd numbered current feedback values i1, i3 and i5 are additionally supplied to suitable means 66 for deriving a resultant value iDC representative of the magnitude of current in the d-c conductor P of the inverter 14, and iDC is fed back to the control means 20.

FIG. 7 illustrates the basic components and their interconnections in the first comparing and logic circuits 65A. The current feedback value i4 is subtracted from the current feedback value i1 at a summing point 67 to derive a current feedback value iA equal to their difference. Consequently iA is representative of the load current in line A that is connected between the first phase of the load circuit 12 and the juncture of valves GTO1 and GTO4 (see FIG. 2). The latter value is supplied directly to a first input of a bipolar comparator 68 and via a polarity inverter 69 to a second input of the comparator 68, and it is also fed back to the control means 20 where it is used for various conventional control and protective purposes. The comparator 68 has a third input that is supplied with the current reference signal PTL, and its output is connected to the line 55. The signal PTL has a desired constant value. The comparator 68 is so arranged that its output is low or "0" except when the absolute magnitude of the phase A load current exceeds a predetermined threshold magnitude (e.g., 1,400 amperes) that is higher than the maximum magnitude normally expected, as determined by the setting of the source 51 of the reference signal PTL. Whenever this threshold is exceeded, the comparator 68 produces a high or "1" output signal which is the previously mentioned both off-A signal. The gating means 30A responds to the latter signal by causing turn-off signals to be applied to both of the phase A pair of valves GTO1 and GTO4 concurrently, thereby turning off whichever one of these valves was conducting load current at the time the signal on line 55 changed from 0 to 1. This protective strategy is useful so long as load current is not increasing fast enough to rise above the turn-off limit of the conducting valve during the time required by this valve to complete a successful turn-off process.

The circuits shown in FIG. 7 include a pair of duplicate, bistable comparators 71 and 72 respectively supplied with the current feedback values i1 and i4 and arranged to compare such values with the constant value of the current reference signal ILL which is determined by the setting of the source 52 and which is very much smaller than the value of the other reference signal PTL. Each of these comparators has alternative first and second operating states. The first state occurs if the corresponding current feedback value is higher than the constant value of the reference signal ILL, in which event the comparator's output is low or "0". The second or opposite state occurs otherwise, and it results in a high or "1" output. The constant value of signal ILL is representative of a predetermined low level of load current. A very low level (ideally zero) is desirable to enhance the sensitivity and speed of response of the valve state sensor, but an appreciable level (e.g., in a range of approximately two to three percent of the turn-off current limit of the valves) is required to be sure that the "0" output state of the comparator will not be caused by electrical "noise." For one practical application of the invention, the level is set at 50 amperes.

The output of the comparator 71 is connected via a line 73 to a first input of a first NOR logic circuit 75. The signal on line 73 is 0 whenever the comparator 71 is in its first state and is 1 otherwise. The first state of the comparator 71 occurs only if the current sensed by the current sensor 15 associated with valve GTO1 is in the forward direction of this valve and has a magnitude exceeding the aforesaid predetermined level. This is true when GTO1 is in its turned-on state. The output of the comparator 72 is connected via a line 76 to a first input of a second NOR logic circuit 78. The signal on line 76 will be 1 except when the comparator 72 is in its first state which occurs only if the current sensed by the current sensor 16 associated with the valve GTO4 is in the forward direction of this valve and has a magnitude exceeding the aforesaid predetermined level, as will be true when GTO4 is in its turned-on state.

The FIG. 7 circuits also include a pair of duplicate, bistable comparing means 81 and 82. Each of the latter means has first and second inputs, and it comprises summing means 83 for subtracting whatever value is received at its second input from whatever value is received at the first input. The difference between these input values is supplied to a polarity detector 84 having alternative first and second operating states. The first state occurs if the polarity of the difference value is positive, in which event the detector's output is 0. The second or opposite state occurs otherwise, and it results in a 1 output. As is shown in FIG. 7, the voltage feedback value VAN is supplied to the first input of the first comparing means 81 through a resistor 85 having a predetermined ohmic value R, and it is also supplied to the first input of the second comparing means 82 through a resistor 86 that is a duplicate of resistor 85. The voltage feedback value VPN is supplied to the second input of the first comparing means 81 through a resistor 87 having a predetermined ohmic value (e.g., 3R) that is more than twice R, and it is supplied to the second input of the companion comparing means 82 through a resistor 88 having a predetermined ohmic value (e.g., 1.5R) that is less than twice R. The output of the first comparing means 81 is connected directly to the second input of the first NOR circuit 75 via a line 91, whereas the output of the comparing means 82 is connected by means of a polarity inverter 92 and a line 94 to the second input of the second NOR circuit 78.

In operation, the first comparing means 81 provides on the line 91 a signal that is low or "0" whenever the polarity detector 84 is in its first state, and this signal is 1 otherwise. The first state of the polarity detector 84 in the first comparing means occurs only if the potential difference between line A and the negative d-c conductor N exceeds a predetermined first fraction of the potential difference between the two d-c conductors P and N. The first fraction is greater than approximately $\frac{1}{4}$ but less than $\frac{1}{2}$, and in the illustrated embodiment of the invention it is $\frac{1}{3}$. When valve GTO1 is in its turned-on state, VAN will be more than VPN/3 even if the opposite valve GTO4 were also turned on (in which case VAN would equal approximately VPN/2). Consequently the 0 output state of the first comparing means 81 occurs whenever GTO1 is turned on.

On the other hand, the second comparing means 82 provides on the line 94 a signal that is high except when the polarity detector in this comparing means is in its first state. The first state of this polarity detector occurs only if the potential difference between line A and the negative d-c conductor N does not exceed a predetermined second fraction of the potential difference between the two d-c conductors P and N. The second fraction is less than approximately $\frac{3}{4}$ but greater than $\frac{1}{2}$, and in the illustrated embodiment of the invention it is $\frac{2}{3}$. When valve GTO4 is in its turned-on state, VAN will be less than 2VPN/3 even if the opposite valve GTO1 were also turned on (in which case VAN would equal approximately VPN/2). Consequently the zero output state of the second comparing means 82 occurs whenever GTO4 is turned on.

The output of the first NOR circuit 75 is connected to one of the two inputs of an AND logic circuit 96, and it is also connected to the line 53 that supplies the state 1 signal to the previously described gating means 30A. It will be apparent that the output of the NOR circuit 75 and hence the signal on line 53 is high only if both inputs of this circuit are 0 concurrently. As will soon be more fully explained, the present invention uses this unique output to indicate that the valve GTO1 is actually in a turned-on state. Whenever the current feedback value i1 is lower than the constant value of the reference signal ILL, the state 1 signal on line 53 is 0. The output of the second NOR circuit 78 is connected to the other input of the AND circuit 96, and it is also connected to the line 54 that supplies the state 4 signal to the gating means 30A. The output of the NOR circuit 78 and hence the signal on line 54 is high only if both inputs of this circuit are 0 concurrently. The present invention uses this unique output to indicate that the valve GTO4 is actually in a turned-on state. Whenever the current feedback value i4 is lower than the constant value of the reference value ILL, the state 4 signal on line 54 is 0.

The line 56 interconnects the gating means 30A and the output of the AND circuit 96. The latter circuit is operative only when high signals are being provided concurrently by the first and second NOR circuits 75 and 78 to produce a high hold A signal on the line 56. Consequently, a high signal is produced on line 56 whenever the complementary valves GTO1 and GTO4 are simultaneously turned on. Persons skilled in the art will understand that if the voltage comparing means 81 and 82 were omitted from the circuits shown in FIG. 7 a high hold A signal could be falsely produced on line 56 when only one valve is actually conducting. This is so because in practice the magnitude of d-c link voltage (i.e., the voltage across the d-c conductors P and N) is not always constant. Variations are likely as the vehicle traverses gaps in the third rail or as other vehicles having electrical propulsion systems energized from the same wayside power source change their speeds. The resulting undulations in the d-c link voltage will cause the snubber capacitor across the turned-off valve (GTO1 or GTO4) to add or subtract charge, and the associated current sensor will provide a current feedback value (i1 or i4) representative of the capacitor charging and discharging currents. Such charging current has the proper direction and could have a sufficiently high magnitude to cause the corresponding comparator (71 or 72) to switch to its first operating state, thereby falsely indicating that the non-conducting valve is in a turned-on state.

As was explained above, a high hold A signal will be produced on the output line 56 of the valve state sensor 50 if a shoot through is caused by both of the valves GTO1 and GTO4 conducting appreciable current simultaneously. It will be apparent that the valve state sensor will also detect a shoot through caused by either one of the freewheeling diodes D1 or D4 failing to withstand reverse voltage across its anode-cathode junction during a normal conducting interval of the opposite valve GTO4 or GTO1.

While only one embodiment of the invention has been shown and described by way of example, many modifications will undoubtedly occur to persons skilled in the art. For example, the valve state sensor of this invention would be useful with an alternative protective strategy of simultaneously turning on all six valves GTO1-GTO6 when a shoot through is detected so that each valve would then have to conduct only one-third of the resulting surge of short-circuit current. If desired, the reference potential for the voltage feedback value deriving means 61-63 shown in FIG. 6 could be VP instead of VN, in which case the inputs to the NOR logic circuits shown in FIG. 7 would be interchanged so that the line 91 is connected to circuit 78 and line 94 is connected to circuit 75. The concluding claims are therefore intended to cover all such modifications that fall within the true spirit and scope of the invention.

We claim:

1. Improved means for detecting the conducting state of at least one electric value in an electric power converter having first and second alternately conducting controllable electric valves connected in series with one another between relatively positive and negative d-c conductors that are adapted to be connected to a source of electric power, the juncture of the valves forming an a-c terminal adapted to be connected to an alternating current load circuit, each valve having a control electrode to which alternative turn-on and turn-off signals are periodically applied and being respectively switched by such signals between turned-on and turned-off states, the first valve when turned on being arranged to freely conduct load current from the positive d-c conductor to said a-c terminal, and the second valve when turned-on being arranged to freely conduct load current from the a-c terminal to the negative d-c conductor, wherein the improvement comprises:

(a) voltage sensing means coupled to the a-c terminal and to both of the d-c conductors for deriving two voltage feedback values respectively representative of the potential difference between said d-c conductors and the potential difference between said a-c terminal and said negative d-c conductor;

(b) first bistable value comparing means responsive to said voltage feedback values and having alternative first and second operating states, said first state occurring if the potential difference between said a-c terminal and said negative d-c conductor exceeds a predetermined first fraction of the potential difference between said d-c conductors and said second state occurring otherwise, said first fraction being greater than approximately $\frac{1}{4}$ but less than $\frac{1}{2}$, whereby said first state occurs when said first valve is turned on;

(c) current sensing means for deriving a first current feedback value representative of the magnitude of current conducted by said first valve;

(d) second bistable means for comparing said first current feedback value with a constant value representative of a predetermined level of current and having alternative first and second operating states, said first state of said second means occurring if the magnitude of current conducted by said first valve exceeds said predetermined level, and said second state of said second means occurring otherwise, whereby said first state of said second means occurs when said first valve is turned on; and (e) logic means responsive to the states of both said first means and said second means for providing a signal indicative of whether or not said first valve is in a turned-on state.

2. The improvement of claim 1, in which said logic means is so arranged that the signal it provides will indicate said first valve is turned on only when said first means and said second means are concurrently in their respective first states.

3. The improvement of claim 1 for an electric power converter wherein the first and second valves are gate turnoff thyristors.

4. The improvement of claim 1, and further comprising: third bistable means responsive to said voltage feedback values and having alternative first and second operating states, said first state of said third means occurring if the potential difference between said a-c terminal and said negative d-c conductor does not exceed a predetermined second fraction of the potential difference between said d-c conductors and said second state of said third means occurring otherwise, said second fraction being less than approximately $\frac{3}{4}$ but greater than $\frac{1}{2}$ whereby said first state of said third means occurs when said second valve is turned on; second current sensing means for deriving a second current feedback value representative of the magnitude of current conducted by said second valve; fourth bistable means for comparing said second current feedback value with said constant value and having alternative first and second operating states, said first state of said fourth means occurring if the magnitude of current conducted by said second valve exceeds said predetermined level and said second state of said fourth means occurring otherwise, whereby said first state of said fourth means occurs when said second valve is turned on; and second logic means responsive to the states of both said third means and said fourth means for providing a signal indicative of whether or not said second value is in a turned-on state.

5. The improvement of claim 4, in which said logic means are so arranged that the signal provided by the first-mentioned logic means will indicate said first valve is turned on only when said first and second bistable means are concurrently in their respective first states and the signal provided by said second logic means will indicate said second valve is turned on only when said third and fourth bistable means are concurrently in their respective first states; and further comprising third logic means associated with the other two logic means and operative to indicate that said first and second valves are simultaneously turned on only if all four of said bistable means are in their respective first states concurrently.

6. The improvement of claim 5 for an electric power converter wherein the timing of the alternative turn-on and turn-off signals applied to the respective control electrodes of said first and second valves is determined by associated gating means the operation of which is normally controlled by a train of discrete command signals, the improvement further comprising annuling means responsive to operation of said third logic means for suspending normal operation of the gating means and thereby preventing any further changes of said turn-on and turn-off signals in the abnormal event both valves are in turned-on states simultaneously.

7. The improvement of claim 6, in which said predetermined level of current is in a range of approximately two to three percent of the turn-off current limit of said valves.

8. The improvement of claim 6, in which said annuling means is effective to suspend normal operation of the gating means for at least a predetermined desired period of time after operation of said third logic means commences.

9. The improvement of claim 8, and further comprising means associated with said annuling means for disabling the gating means as soon as operation of said third logic means terminates and said desired period expires, the gating means when disabled being arranged to cause turn-off signals to be applied to both valves.

10. For use in an electric power converter having first and second alternately conducting controllable electric valves connected in series with one another between relatively positive and negative d-c conductors that are adapted to be connected to a source of electric power, the juncture of the valves forming an a-c terminal adapted to be connected to an alternating current load circuit, each valve having a control electrode to which alternative turn-on and turn-off signals are periodically applied and being respectively switched by such signals between turned-on and turned-off states, the first valve when turned on being arranged to freely conduct load current from the positive d-c conductor to said a-c terminal, and the second valve when turned-on being arranged to freely conduct load current from the a-c terminal to the negative d-c conductor, the converter also having control means including driver means for supplying the aforesaid turn-on and turn-off signals, gating means connected to the driver means for determining the timing of such signals, and suitable means associated with the gating means for providing a train of discrete command signals that normally control the operation of the gating means, improved means for protecting the valves in the abnormal event that both valves are in turned-on states simultaneously, comprising:

(a) first means associated with said first valve for providing a first output signal to indicate that said first valve is in a turned-on state;

(b) second means associated with said second valve for providing a second output signal to indicate that said second valve is in a turned-on state;

(c) third means coupled to said first and second means and operative to indicate that said first and second valves are simultaneously turned on only when said first and second output signals are being provided concurrently; and (d) annuling means responsive to operation of said third means for suspending normal operation of said gating means, whereby said driver means temporarily holds whatever turn-on and turn-off signals are extant at the time operation of said third means commences.

11. The improved protecting means of claim 10 and further comprising timing means associated with said annuling means for sustaining the turn-on and turn-off signal-holding action for a predetermined desired period of time after operation of said third means commences.

12. Improved means for detecting simultaneous conduction by a pair of complementary electric valves in an electric power converter having first and second alternately conducting controllable electric valves connected in series with one another between relatively positive and negative d-c conductors that are adapted to be connected to a source of electric power, the juncture of the valves forming an a-c terminal adapted to be connected to an alternating current load circuit, each valve having a control electrode to which alternative turn-on and turn-off signals are periodically applied and being respectively switched by such signals between turned-on and turned-off states, the first valve when turned on being arranged to freely conduct load current from the positive d-c conductor to said a-c terminal, and the second valve when turned-on being arranged to freely conduct load current from the a-c terminal to the negative d-c conductor, wherein the improvement comprises:

(a) voltage sensing means coupled to the a-c terminal and to both of the d-c conductors for deriving two voltage feedback values respectively representative of the potential difference between said d-c conductors and the potential difference between said a-c terminal and said negative d-c conductor;

(b) a pair of current sensing means for deriving first and second current feedback values respectively representative of the magnitudes of current conducted by said first and second valves;

(c) means for providing a constant value representative of a predetermined level of current;

(d) first means responsive to said feedback values and to said constant value for providing a first output signal that indicates a turned-on state of said first valve if the magnitude of current conducted by said first valve exceeds said predetermined level and the potential difference between said a-c terminal and said negative d-c conductor exceeds a predetermined first fraction of the potential difference between said d-c conductors, said first fraction being greater than approximately $\frac{1}{4}$ but less than $\frac{1}{2}$;

(e) second means responsive to said feedback values and to said constant value for providing a second output signal that indicates a turned-on state of said second valve if the magnitude of current conducted by said second valve exceeds said predetermined level and the potential difference between said a-c terminal and said negative d-c conductor does not exceed a predetermined second fraction of the potential difference between said d-c conductors, said second fraction being less than approximately $\frac{3}{4}$ but greater than $\frac{1}{2}$; and (f) third means associated with said first and second means and operative to indicate that said first and second valves are simultaneously turned on only when said first and second output signals are being provided concurrently.

* * * * *